Aug. 17, 1948.     H. H. McCARL     2,447,022
STACKING RECEPTACLE
Filed July 19, 1945
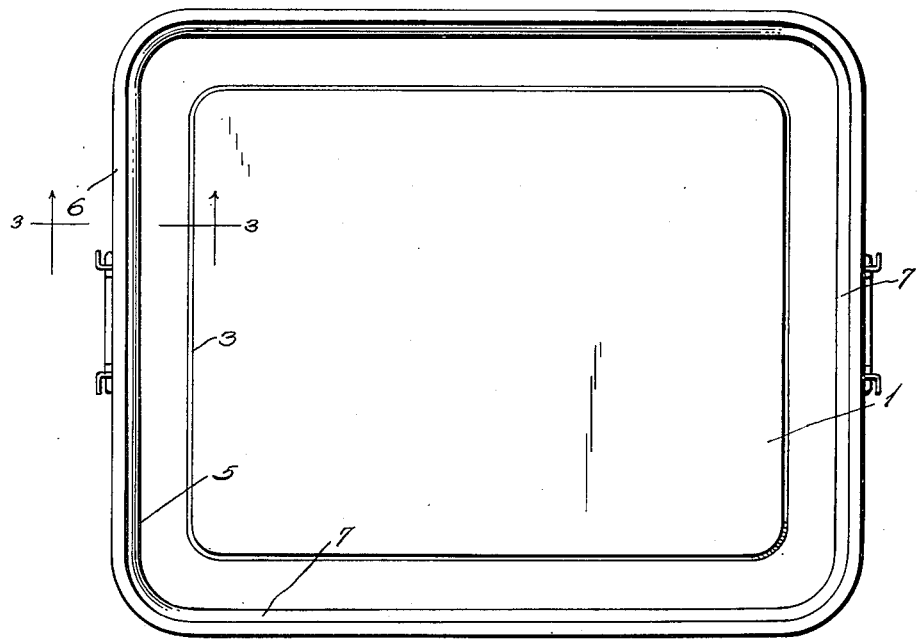
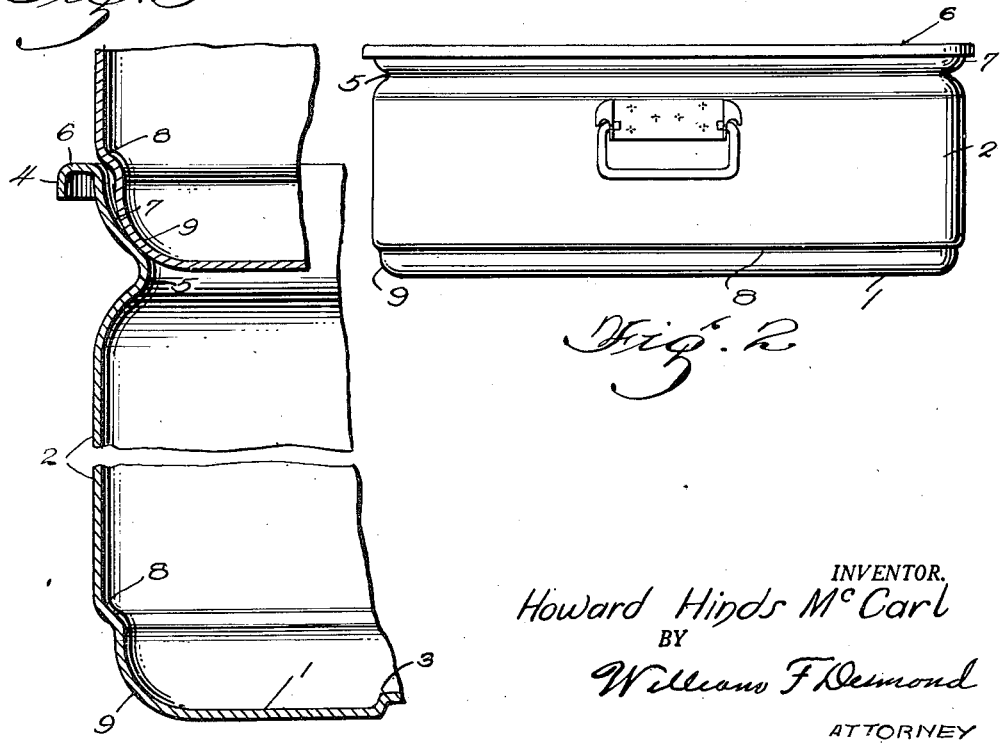
INVENTOR.
Howard Hinds McCarl
BY
William F. Desmond
ATTORNEY Patented Aug. 17, 1948

2,447,022

UNITED STATES PATENT OFFICE 2,447,022

STACKING RECEPTACLE

Howard Hinds McCarl, Washington, D. C.

Application July 19, 1945, Serial No. 606,016

1 Claim. (Cl. 220—97)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates generally to receptacles and has particular relation to meat delivery receptacles which may be stacked one upon the other.

An object of this invention is to provide an improved receptacle having substantially vertical sides and of such construction as to facilitate stacking one pan in another without binding or wedging.

A further object of this invention is to provide an improved receptacle having substantially vertical side walls and convex and concave portions of different radii of curvature whereby when a plurality of receptacles are stacked, the convex and concave portions of respective receptacles coact and have substantially line contact to prevent wedging or binding.

A further object of this invention is to provide an improved receptacle with substantially vertical side walls, a concave portion near the top of the receptacle, and a convex portion near the bottom of the receptacle whereby when a plurality of receptacles are stacked in nesting relationship, the vertical side walls of the several receptacles are maintained in alignment.

Other objects and advantages of the present invention will appear in the following detailed description and be particularly pointed out in the appended claim, reference being had to the accompanying drawing forming part of this specification, and in which:

Figure 1 is a plan view of a receptacle embodying this invention;

Figure 2 is an end elevational view showing the substantially vertical side walls and concave and convex portions near the top and bottom of the receptacle; and Figure 3 is a sectional detail taken along line 3—3 of Figure 1 and showing the manner of stacking.

The specific handle shown in Figures 1 and 2 is the subject matter of an application, S. N. 606,015, filed July 19, 1945, now Patent No. 2,444,056.

Referring to the drawing, the receptacle comprises a bottom wall 1 and a vertical side wall 2. The bottom has a reinforcing boss 3 extending continuously around the receptacle as shown in Figure 1. The top of the side wall is folded down as at 4 and near the rim 6 a continuously extending bead 5 is formed inwardly. The top of the bead presents a continuously extending portion 7 concaved inwardly. The greater portion of the side wall 2 is substantially vertical and perpendicular to the bottom 1 of the receptacle. Near the bottom of the receptacle the side wall is bent inwardly at 8 to strengthen the side wall and merges into the bottom 1 through a portion 9, convexed outwardly. Thus as clearly shown in Figure 3 of the side wall 2 merges into the convex portion 9 by means of the S-section 8.

Figure 3 clearly shows how a plurality of receptacles are freely stacked one above the other in nesting relationship without binding or wedging. Stacking may occur while the receptacles are filled. When the receptacles are stacked, the convex portion 9 of the upper receptacle contacts the concave portion 7 of the lower receptacle continuously around the receptacle.

It is to be noted that the radius of curvature of the convex portion 9 is somewhat less than the radius of curvature of the concave portion 7. This feature provides for substantially a line contact between the concave and the convex portions and provides for a free space between the upper portions of coacting convex and concave portions in nesting relation as shown in Figure 3. This free space, coupled with the bearing being substantially along a line of contact, enables ready separation of stacked receptacles without the possibility of receptacles being wedged together.

It is also to be noted that when the receptacles are stacked, the reinforcing S-section 8 positions the vertical or perpendicular part of wall 2 of the upper receptacle above and clear of the lower receptacle and in direct alignment with the vertical or perpendicular portion of the wall 2 of the lower receptacle. Thus the S-section 8, positioned between the vertical portion of the wall and the convex portion 9, enables the convex portion 9 to have a smaller radius of curvature than the concave portion 7 so as to be spaced therefrom at the top, and at the same time enables the side walls to be substantially vertical to provide for a receptacle of maximum content. The S-section 8 also provides for the vertical portions of the walls of the several stacked receptacles to be in the same plane and in vertical alignment and be clear of adjoining receptacles. All of these functions of S-section 8 are in addition to its reinforcing function to strengthen the receptacle adjacent to the convex portion 9 to prevent possible buckling at a point where buckling must be avoided if the receptacles are to fit freely for stacking at all times. Also the bead 5 and rim 6 strengthen the top of the receptacle to prevent buckling at that point to insure a proper fit for nesting at all times.

The receptacle illustrated is rectangular in plan view but the invention is applicable to circular receptacles or receptacles having other shapes.

While the invention has been described in more or less detail, it is not to be limited thereby, as changes may be made in the form, arrangement and construction of parts, and equivalents may be substituted, without departing from the spirit and scope of the invention, the form hereinbefore described being merely a preferred embodiment thereof.

What I claim is:

An open-topped receptacle comprising a bottom wall and vertical side walls, a continuously-extending inwardly directed bead below the top edge of the side wall forming between said bead and the top edge an inwardly facing concave portion, a continuously extending outwardly facing convex portion integrally connecting the side wall to the bottom wall and inset slightly from the side wall, to lie beneath the concave portion, said convex portion having a cross-sectional radius of curvature slightly less than the cross-sectional radius of curvature of said concave portion, whereby when several receptacles are stacked, one above the other, the concave portion of the lower receptacle will contact and support the convex portion of the upper receptacle substantially along a line of contact and the receptacles will be nested without wedging.

HOWARD HINDS McCARL.

REFERENCES CITED

The following references are of record in the file of this patent:

UNITED STATES PATENTS

| Number | Name | Date |
|---|---|---|
| 1,538,085 | Brooks | May 19, 1925 |
| 1,650,520 | Johnson | Nov. 22, 1927 |
| 1,820,497 | Rose | Aug. 25, 1931 |
| 1,981,627 | Merriman | Nov. 20, 1934 |
| 2,119,745 | Ingersoll | June 7, 1938 |
| 2,352,667 | Tofanelli | July 4, 1944 |

FOREIGN PATENTS

| Number | Country | Date |
|---|---|---|
| 192,437 | Germany | Jan. 11, 1907 |